W. H. MAHONEY.
DRAW BAR AND COUPLING CONNECTOR.
APPLICATION FILED OCT. 21, 1914.

1,141,810. Patented June 1, 1915.

WITNESSES

INVENTOR
William H. Mahoney
BY
ATTORNEYS

UNITED STATES PATENT OFFICE.

WILLIAM H. MAHONEY, OF HINGHAM, MASSACHUSETTS.

DRAW-BAR AND COUPLING-CONNECTOR.

1,141,810.  Specification of Letters Patent.  Patented June 1, 1915.

Application filed October 21, 1914. Serial No. 867,799.

*To all whom it may concern:*

Be it known that I, WILLIAM H. MAHONEY, a citizen of the United States, and a resident of Hingham, in the county of Plymouth and State of Massachusetts, have invented a new and Improved Draw-Bar and Coupler-Connector, of which the following is a full, clear, and exact description.

Among the principal objects which the present invention has in view are: to provide means for quickly and readily removing couplers from the yoke members of railway vehicles; to effect a saving in the cost of maintenance of yoke members and couplers therefor; to provide a connector for couplers arranged to fit the parts on which it is mounted snugly and to eliminate noise and wear thereof.

Figure 1:
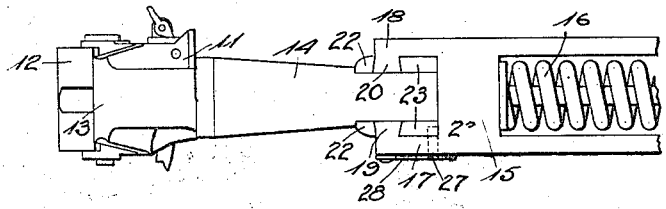
Figure 2:
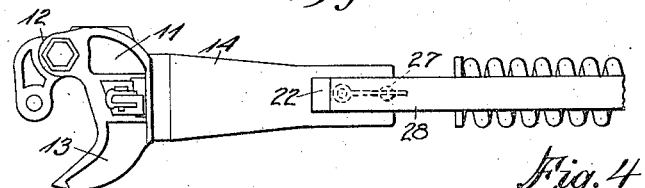
Figure 3:
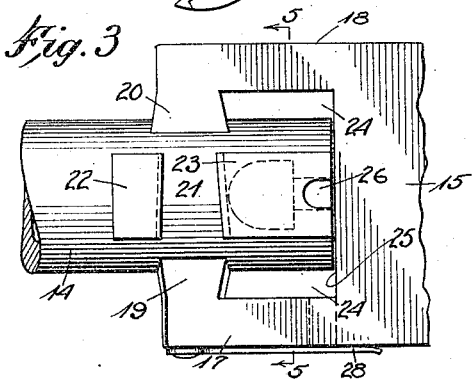
Figure 4:
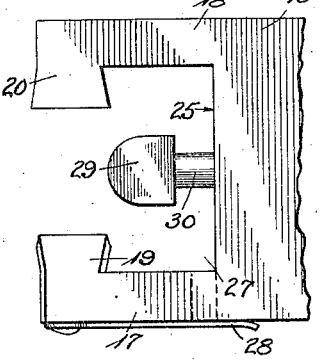
Figure 5:
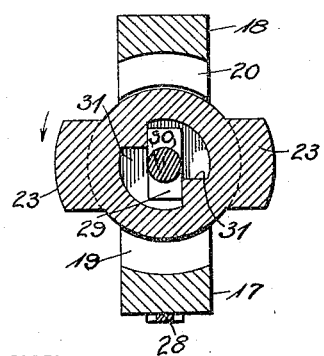
Figure 6:
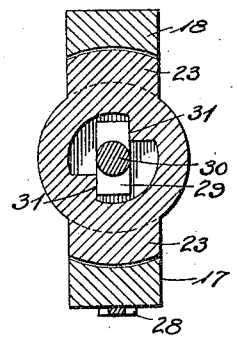

*Drawings.*—Figure 1 is a side view of a forward end fragment of a yoke and a coupler provided with a connector, constructed and arranged in accordance with the present invention. Fig. 2 is a top plan view of the same; Fig. 3 is a detail view on an enlarged scale, showing the means for connecting the yoke and coupler shank, the coupler shank being shown as unlocked from the yoke; Fig. 4 is a detail view similar to Fig. 3, the coupler shank being removed; Fig. 5 is a vertical section taken on the line 5—5 in Fig. 3, showing the coupler shank in its unlocked relation; and Fig. 6 is a similar view, showing the coupler shank as having been turned to the locking position.

*Description.*—As seen in the drawings, the coupler head 11 has a conventional shape and structure, wherein is embodied the knuckle 12 and horn 13. Said head is integrally mounted on a shank 14. When the shank 14 is rigidly or integrally formed with the yoke, difficulty has been experienced, in that when the knuckle of the coupler head is broken or jammed, as frequently happens, the repair necessitated thereby, consists in removing the coupler head, shank and portion of the yoke, or at least requiring that the suspension straps be loosened or spread, all of which requires time and more or less care. In the present invention, this objection is overcome by providing a separable shank and a releasing lock for the same. The yoke 15 is centrally slotted to contain the spring 16. At the forward end the yoke is provided with extension arms 17 and 18. The arms 17 and 18 have inturned projections 19 and 20. The projections 19 and 20 are flared from their bases to their ends, forming dovetailed projections. The projections 19 and 20 are wedge shaped in cross section, the smaller end of the wedge being turned toward the larger end of the channels 21 formed between lugs 22 and 23 on the shank. The lugs 22 and 23 are undercut, as shown best in Fig. 3 of the drawings. The undercut of the lugs 22 and 23 corresponds to the incline of the side walls of the projections 19 and 20. The opening between the ends of the projections 19 and 20 is amply sufficient for the passage of the lugs 23. The lugs 23 are shaped to conform with and to fill the spaces 24 formed by the projections 19 and 20 and the wall 25 of the yoke 15. The wall 25 forms a bearing for the end of the shank 14 when in service. The coöperation of the inclined faces of the lugs 23 and projections 19 and 20 results in forcing the shank 14 backward in firm contact with the wall 25 of the yoke 15. Coöperating with the lugs 23 and projections 19 and 20, the inclined undercut side of the lugs 22 grips the forward sides of the said projections, when the shank 14 is revolved from the position shown in Figs. 3 and 5 of the drawings, to the position shown in Fig. 6.

One of the lugs 23 at the end of the shank 14, is provided with a recess 26, in which a key pin 27 is inserted when the shank is disposed in service relation, as shown best in Figs. 1 and 3 of the drawings. The pin 27 is maintained in service relation by a spring keeper 28. A groove is cut in the exposed end of the pin 27 to receive the free end of the keeper 28, as shown best in Figs. 1 and 2 of the drawings.

From the above it will be seen, the shank 14 and head 11 formed thereon, may be removed from engagement with the end of the yoke, by first lifting the keeper 28 and withdrawing the pin 27 and then rotating the shank 14 until the lugs 22 and 23 are disposed, as shown in Fig. 3 of the drawings. The shank 14 may now be drawn from between the projections 19 and 20 to be repaired or replaced. The reverse order of the above-stated operation is followed when replacing the shank 14. The key pin 27 is then lifted to permit the rotation of the shank to engage the projections 19 and 20 with the lugs 22 and 23. When the recess 26 registers with the key pin 27, the said key pin is permitted to drop into the said recess to be there retained by the keeper 28.

In service the relative rise and fall of the joined ends of cars imparts a strain upon the coupler heads and parts connected therewith. This strain is transmittted through the knuckle 12, tending to rotate the said coupler heads and shank 14. To assist the projections 19 and 20 and lugs 22 and 23 in resisting this torsional strain, I provide a flat key head 29. The shank 14 is hollowed and the rear wall is slotted to permit the insertion of the head 29. The head 29 is rigidly connected by means of a short shank 30 at the end of the yoke 15, as seen best in Fig. 4 of the drawings. The head 29 is provided to bear on the shoulders 31 when the same are rotated to the service position, best shown in Fig. 6 of the drawings. It will be seen by comparing Figs. 6 and 2 of the drawings, that the torsional strain exerted by the knuckle 12 of the coupler head 11, is resisted by the shoulders 31 and the key head 29.

Claim:

A device as characterized comprising, a yoke embodying a plurality of extended arms, said arms having each an inturned dovetailed wedge shaped projection; a coupler shank adapted for insertion between said projections; a plurality of lugs rigidly mounted on said shank in paired relation, the members of said pairs being spaced apart and having the adjacent edges shaped in correspondence with the side edges of said projections; means for locking the said shank in service position; an elongated key head extensible within the end of said shank; and means provided on said shank to engage said key head when said shank is in service position.

In testimony whereof I have signed my name to this specification in the presence of two subscribing witnesses.

WILLIAM H. MAHONEY.

Witnesses:
  E. F. MONDOCK,
  PHILIP D. ROLLHAUS.